CRUMB & SEARS.
Cheese Vat.
No. 65,881.
Patented June 18, 1867.
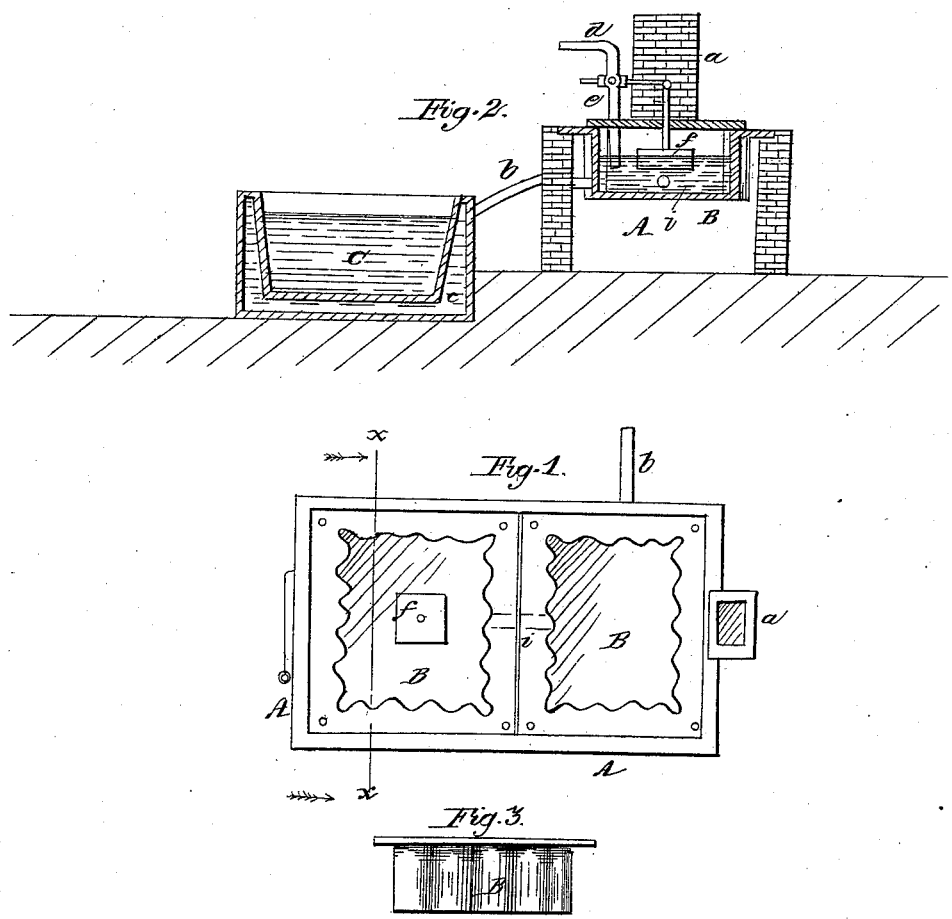

United States Patent Office.

JOSEPH H. CRUMB AND LEWIS SEARS, OF DE RUYTER, NEW YORK.

Letters Patent No. 65,881, dated June 18, 1867.

CHEESE-VAT.

*The Schedule referred to in these Letters Patent and making part of the same.*

TO ALL WHOM IT MAY CONCERN:

Be it known that we, JOSEPH H. CRUMB and LEWIS SEARS, of De Ruyter, in the county of Madison, and State of New York, have invented a new and useful Improvement in Cheese-Vat; and we do hereby declare that the following is a full, clear, and exact description thereof, which will enable those skilled in the art to make and use the same, reference being had to the accompanying drawings, forming part of this specification, in which—

Figure 1 is a top view of the furnace and heaters.
Figure 2 is a cross-section of the same, taken in the line $x\ x$ in fig. 1.
Figure 3 is a side elevation of one of the heaters.
Similar letters of reference indicate corresponding parts in all the figures.

This invention relates to new and useful improvement in cheese-vat, whereby an efficient and more durable apparatus is obtained. Heretofore heaters for cheese-vats have been constructed of sheet metal, but such heaters are usually worn out in one or two seasons by rust and wear, and are necessarily made with plain surfaces, as so much labor is required to put them together when corrugated that they become too expensive. We construct our heaters of cast iron, and cast them with corrugated fire surfaces so that their heating surfaces are largely increased, and, by the use of cast iron, vessels of much greater endurance are obtained. We also employ a float for regulating the supply of water in the heaters, as hereinafter explained.

In the accompanying drawings, A is the furnace, and $a$ its chimney; B B are the heaters. The milk-vat C and its water jacket $c$ are shown by red outline in fig. 2. The heaters are connected together by pipes $i$, (fig. 2,) and communicate with the water-jacket $c$ by a pipe, $b$. $d$ is the pipe for supplying cold water to the heaters, and is provided with a valve or cock, $e$, which is operated by a float, $f$, so that when the water in the heater falls the float $f$ settles down and opens valve $e$ and admits water to the heaters until the float is elevated, and valve $e$ closed again, and by this arrangement the cold-water feed for the heaters is made self-acting. The sides of the heaters B are corrugated, as shown by figs. 1 and 3, and their heating surfaces thereby much increased. By these means the apparatus is made more efficient and more durable.

Having thus described our invention, what we claim as new, and desire to secure by Letters Patent, is—

The employment of cast-iron heaters B, in combination with pipe $b$, hot-water jacket $c$, and milk-vat C, constructed substantially as and for the purpose set forth.

The float $f$ in connection with supply pipe and valve $d\ e$, heaters B, and milk-vat C $c$, as and for the purpose herein described.

The above specification of our invention signed by us this 9th day of April, 1866.

JOSEPH H. CRUMB,
LEWIS SEARS.

Witnesses:
K. H. C. PRESTON,
F. A. MORLEY.